(12) United States Patent
Shimizu et al.

(10) Patent No.: US 12,140,428 B2
(45) Date of Patent: Nov. 12, 2024

(54) SURVEYING ASSISTANCE DEVICE, SURVEYING ASSISTANCE SYSTEM, SURVEYING ASSISTANCE METHOD, AND STORAGE MEDIUM

(71) Applicant: TOPCON CORPORATION, Tokyo (JP)

(72) Inventors: Ryosuke Shimizu, Tokyo (JP); Motohiro Miyajima, Tokyo (JP); Umihiro Ichiriyama, Tokyo (JP); Keisuke Nakamura, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 69 days.

(21) Appl. No.: 18/116,407

(22) Filed: Mar. 2, 2023

(65) Prior Publication Data

US 2023/0204357 A1 Jun. 29, 2023

Related U.S. Application Data

(63) Continuation of application No. PCT/JP2021/028136, filed on Jul. 29, 2021.

(30) Foreign Application Priority Data

Jul. 31, 2020 (JP) .................................. 2020-130666

(51) Int. Cl.
*G06F 3/0482* (2013.01)
*G01C 15/02* (2006.01)
*G06F 3/0484* (2022.01)
*G06F 3/0488* (2022.01)

(52) U.S. Cl.
CPC ........... *G01C 15/02* (2013.01); *G06F 3/0482* (2013.01); *G06F 3/0484* (2013.01)

(58) Field of Classification Search
CPC ....... G01C 15/02; G01C 15/00; G06F 3/0482; G06F 3/0484
See application file for complete search history.

(56) References Cited

U.S. PATENT DOCUMENTS

| 4,820,041 A * | 4/1989 | Davidson | G01S 5/16 33/294 |
| 5,440,112 A * | 8/1995 | Sakimura | G01C 15/002 250/203.1 |

(Continued)

*Primary Examiner* — Jordany Nunez
(74) *Attorney, Agent, or Firm* — Studebaker & Brackett PC

(57) ABSTRACT

Provided is a surveying assistance method comprising making a computer read design information including center point data of center points set on a centerline of a route and constituent point data of constituent points set on sections including the center points, the section being orthogonal to the centerline, acquires position information indicating a current position of a surveyed device at a predetermined period, calculate a horizontal distance and a vertical distance between the current position and a reference point on a designated section based on the position information and the design information, display the horizontal distance and the vertical distance on a screen of the computer as survey information, and update the display at intervals of the predetermined period, and the reference point is a point to be selected from the center points or the constituent points.

12 Claims, 10 Drawing Sheets

(56) References Cited

U.S. PATENT DOCUMENTS

| | | | | |
|---|---|---|---|---|
| 5,671,160 A * | 9/1997 | Julian | | G01C 15/00 |
| | | | | 702/94 |
| 5,764,062 A * | 6/1998 | Mercer | | E21B 47/0232 |
| | | | | 324/329 |
| 6,078,285 A * | 6/2000 | Ito | | G01C 15/002 |
| | | | | 701/468 |
| 6,191,732 B1 * | 2/2001 | Carlson | | G01S 19/42 |
| | | | | 342/451 |
| 6,563,574 B2 * | 5/2003 | Ohtomo | | G01C 1/04 |
| | | | | 356/4.01 |
| 7,177,016 B2 * | 2/2007 | Ohtomo | | G01C 15/00 |
| | | | | 356/43 |
| 7,671,998 B2 * | 3/2010 | Ohtomo | | G01C 15/00 |
| | | | | 356/601 |
| 7,739,803 B2 * | 6/2010 | Yahagi | | G01S 17/66 |
| | | | | 33/290 |
| 7,933,001 B2 * | 4/2011 | Otani | | G01C 3/00 |
| | | | | 356/3 |
| 8,310,535 B2 * | 11/2012 | Nagashima | | G01C 1/04 |
| | | | | 345/173 |
| 10,469,754 B2 * | 11/2019 | Nagashima | | H04N 23/633 |
| 10,690,498 B2 * | 6/2020 | Turner | | G01S 19/13 |
| 10,767,990 B2 * | 9/2020 | Sasaki | | G06V 10/225 |
| 10,877,155 B2 * | 12/2020 | Sasaki | | G01C 15/002 |
| 11,100,705 B2 * | 8/2021 | Kurihara | | G06V 10/422 |
| 11,236,997 B2 * | 2/2022 | Tanaka | | G01C 15/002 |
| 2002/0085193 A1 * | 7/2002 | Ohtomo | | G01C 1/04 |
| | | | | 356/4.01 |
| 2003/0090646 A1 * | 5/2003 | Riegl | | G01S 17/89 |
| | | | | 356/3 |
| 2004/0246468 A1 * | 12/2004 | Ohtomo | | G01C 15/00 |
| | | | | 356/139.1 |
| 2005/0243329 A1 * | 11/2005 | Ohtomo | | G01C 15/00 |
| | | | | 356/3.01 |
| 2007/0008515 A1 * | 1/2007 | Otani | | G01C 11/00 |
| | | | | 382/106 |
| 2009/0210277 A1 * | 8/2009 | Hardin | | G06Q 10/103 |
| | | | | 705/7.23 |
| 2009/0244277 A1 * | 10/2009 | Nagashima | | G01C 15/002 |
| | | | | 345/173 |
| 2011/0096319 A1 * | 4/2011 | Otani | | G01C 15/00 |
| | | | | 356/3.14 |
| 2012/0133918 A1 * | 5/2012 | Sakimura | | G01C 15/002 |
| | | | | 356/4.01 |
| 2012/0290542 A1 * | 11/2012 | Trotta | | G06F 16/2365 |
| | | | | 707/812 |
| 2013/0198146 A1 * | 8/2013 | Trotta | | G06F 16/2365 |
| | | | | 707/687 |
| 2017/0061605 A1 * | 3/2017 | Nagashima | | G06T 7/70 |
| 2017/0175364 A1 * | 6/2017 | Hasegawa | | G06T 11/40 |
| 2017/0307370 A1 * | 10/2017 | Tanaka | | G01C 15/002 |
| 2018/0274920 A1 * | 9/2018 | Sasaki | | G06V 20/13 |
| 2018/0347980 A1 * | 12/2018 | Kotzur | | G01C 15/008 |
| 2019/0304174 A1 * | 10/2019 | Kurihara | | G06V 20/56 |
| 2020/0096641 A1 * | 3/2020 | Sasaki | | G06T 17/00 |

* cited by examiner

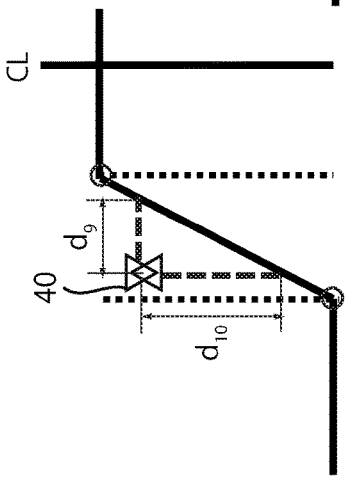
FIG. 11A
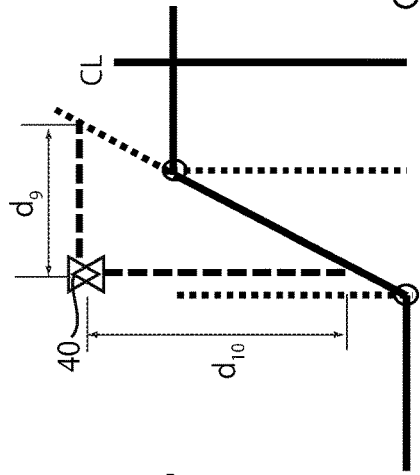
FIG. 11B
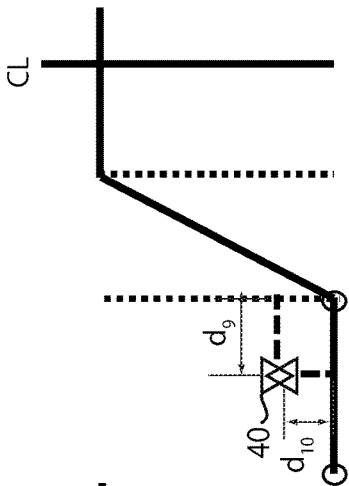
FIG. 11C
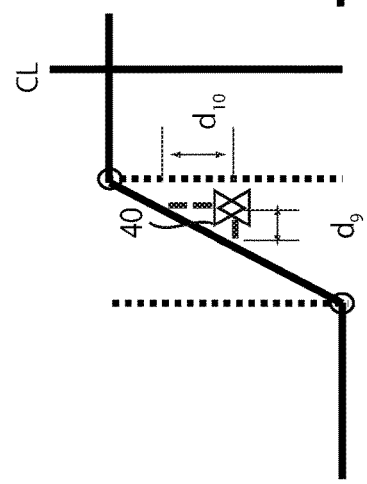
FIG. 11D
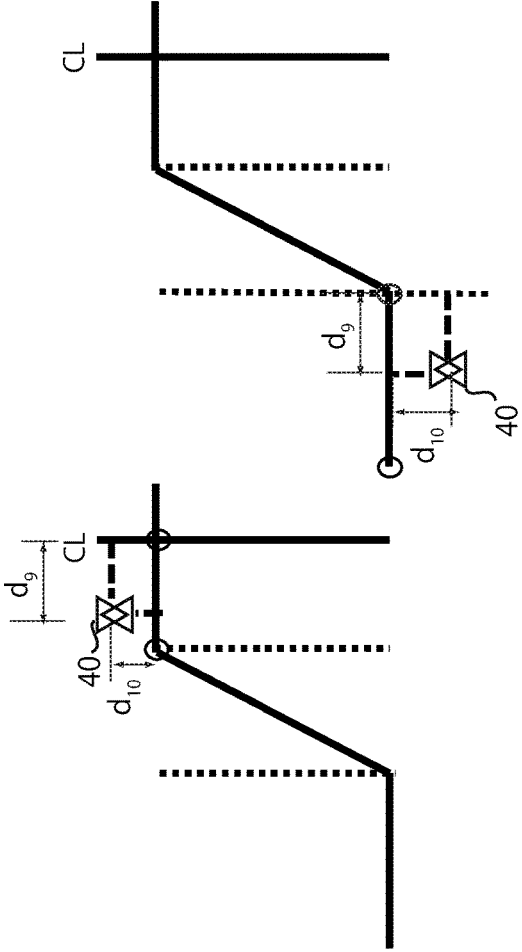
FIG. 11E
FIG. 11F

SURVEYING ASSISTANCE DEVICE, SURVEYING ASSISTANCE SYSTEM, SURVEYING ASSISTANCE METHOD, AND STORAGE MEDIUM

CROSS-REFERENCE TO RELATED APPLICATION, BENEFIT CLAIM, AND INCORPORATION BY REFERENCE

This application is a continuation application of and claims benefit under 35 USC 120 and 365 (c) to copending International Application No. PCT/JP2021/028136, entitled "SURVEYING ASSISTANCE PROGRAM, SURVEYING ASSISTANCE DEVICE, SURVEYING ASSISTANCE METHOD, AND SURVEYING ASSISTANCE SYSTEM", filed 29 Jul. 2021, the content of which is incorporated herein in its entirety by reference.

TECHNICAL FIELD

The present invention relates to a surveying assistance device, a surveying assistance system, a surveying assistance method, and a storage medium.

BACKGROUND ART

In work of a route, etc., a construction plan drawing is prepared, and a construction plan is drawn up while considering the volume of soil of cutting and banking. When preparing a construction plan, a current state of work parts is surveyed in order to set standards for the construction plan. Further, after completion of work, observation of an as-built part is performed. Surveying of the current state includes observation of a center stake distance to determine a distance in a horizontal direction and a distance in a vertical direction from a center stake installation point (center point) set on a centerline of a route. On the other hand, in the observation of the as-built part, constituent points are surveyed, and a distance in the horizontal direction and a distance in the vertical direction are determined and compared with design information.

Such observations of the center stake distance and the as-built part are generally performed by using an electro-optical device such as a total station, or a GNSS device. Further, a technique with which design information including constituent point data is read by a mobile information processing device, and a plan view, a cross-sectional view, and numerical information are displayed on a screen to assist a survey device using a total station or a GNSS device is proposed. (See, for example, Patent Literature 1, Non-Patent Literature 1, etc.)

The observation of the center stake distance and the observation of the as-built part are different from each other in whether a reference point serving as an object with respect to which distances are to be calculated is a center point or a constituent point, but similar to each other in the point that a reference point on design information and a horizontal distance and a vertical distance with respect to an observation point are determined.

CITATION LIST

Patent Literature

Patent Literature 1: Specification of Japanese Patent No. 6224659

Non-Patent Literature

Non-Patent Literature 1: Operation Manual for Data Collector FC-500 Kantoku-san. V, TOPKON CORPORATION, 2. Observation, p. 39-41, p. 70-74

SUMMARY OF INVENTION

Technical Problem

However, in the technique disclosed in Non-Patent Literature 1, a program is executed with observation of a center stake distance and observation of an as-built part being respectively assigned to separate menus. From the view of usability and product development, it has been demanded that the observation of the center stake distance and the observation of the as-built part can be performed with a single menu.

The present invention was made in view of the above circumstances, and an object thereof is to provide a technique with which observations of a center stake distance and an as-built part can be assisted with a single menu.

Solution to Problem

In order to achieve the object described above, a surveying assistance device according to an aspect of the present invention includes screen; and a terminal control unit including a processor and a memory. The processor is configured to read design information including center point data of center points set on a centerline of a route and constituent point data of constituent points set on sections including the center points, the sections being orthogonal to the centerline, acquire position information indicating a current position of a surveyed device at a predetermined period, calculate a horizontal distance and a vertical distance between the current position and a reference point on a designated section based on the position information and the design information, display the horizontal distance and the vertical distance on an observation screen of the screen as survey information, and update display at intervals of the predetermined period and display the position information and the design information on the observation screen. The reference point is a point to be selected from the center point or the constituent point. A position of the reference point in a direction orthogonal to the route is switched by pressing a reference point switching button displayed on the observation screen. Switching of the reference point is performed so that a position of the reference point in the direction orthogonal to the route retains even in a case where a designated section is moved in a route direction.

Further, in the aspect described above, it is also preferable that a section which is the closest to the current position of the surveyed device is selectable from sections included in the design information as the designated section.

Further, in the aspect described above, it is also preferable that the processor is configured to create an arbitrary section including the current position of the surveyed device, the arbitrary section being orthogonal to the centerline, by making interpolation between two sections placed to sandwich the current position, the two sections being included in the design information. The arbitrary section is selectable as the designated section.

Further, in the aspect described above, it is also preferable that a section designated by a worker from the sections included in the design information, a section which is the closest to the current position of the surveyed device from the sections included in the design information, or the arbitrary section is selectable as the designated section.

Further, in the aspect described above, it is also preferable that the processor is configured to calculate and display the horizontal distance and the vertical distance between the position of the surveyed device and a plane linearly connecting two closest constituent points on the designated section.

Further, a surveying assistance system according to another aspect of the present invention includes the surveying assistance device according to the above aspects, and a position acquiring device that acquires the current position of the surveyed device. The position acquiring device and the surveying assistance device are configured to be capable of communication with each other.

Further, a surveying assistance method according to still another aspect of the present invention includes making a computer including a screen unit, a processor and a memory, read design information including center point data of center points set on a centerline of a route and constituent point data of constituent points set on sections including the center points, the sections being orthogonal to the centerline, acquire position information indicating a current position of a surveyed device at a predetermined period, calculate a horizontal distance and a vertical distance between the current position and a reference point on a designated section based on the position information and the design information, display the horizontal distance and the vertical distance on an observation screen of a screen of the computer as survey information, update display at intervals of the predetermined period, and display the position information and the design information on the observation screen. The reference point is a point to be selected from the center point or the constituent point. A position of the reference point in a direction orthogonal to the route is switched by pressing a reference point switching button displayed on the observation screen. Switching of the reference point is performed so that a position of the reference point in the direction orthogonal to the route retains even in a case where a designated section is moved in a route direction.

Further, a storage medium according to still another aspect of the present invention is a computer-readable storage medium including a program for making a computer execute the surveying assistance method according to the above aspect.

Benefits of Invention

With the surveying assistance device, the surveying assistance system, the surveying assistance method, and the storage medium according to the aspects described above, it is possible to execute both a stop stake distance and observation of an as-built part with a single menu.

BRIEF DESCRIPTION OF DRAWINGS

FIGS. 11A to 11F are views each explaining a method of calculating distances in the surveying assistance system according to the same modified example.

DESCRIPTION OF EMBODIMENTS

Hereinafter, preferred embodiments of the present invention will be described with reference to the drawings, however, the present invention is not limited to these. Further, in the embodiments, members having the same functions and configurations will be provided with the same reference signs. And, overlapping description will be omitted as appropriate.

Embodiment (Entire Configuration of System)

Figure 1:
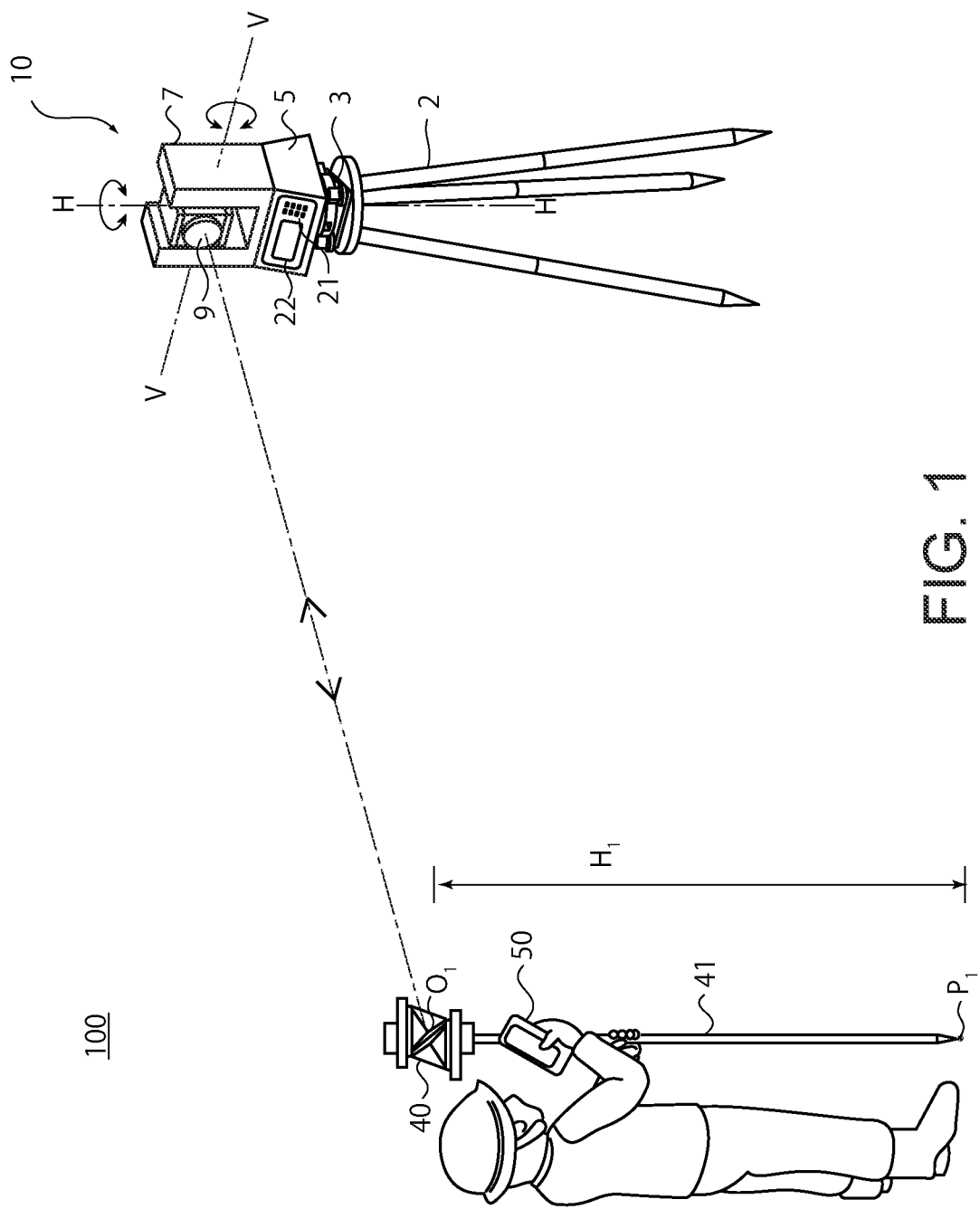
FIG. 1 is a schematic external appearance view of a surveying assistance system according to an embodiment of the present invention.
Figure 2:
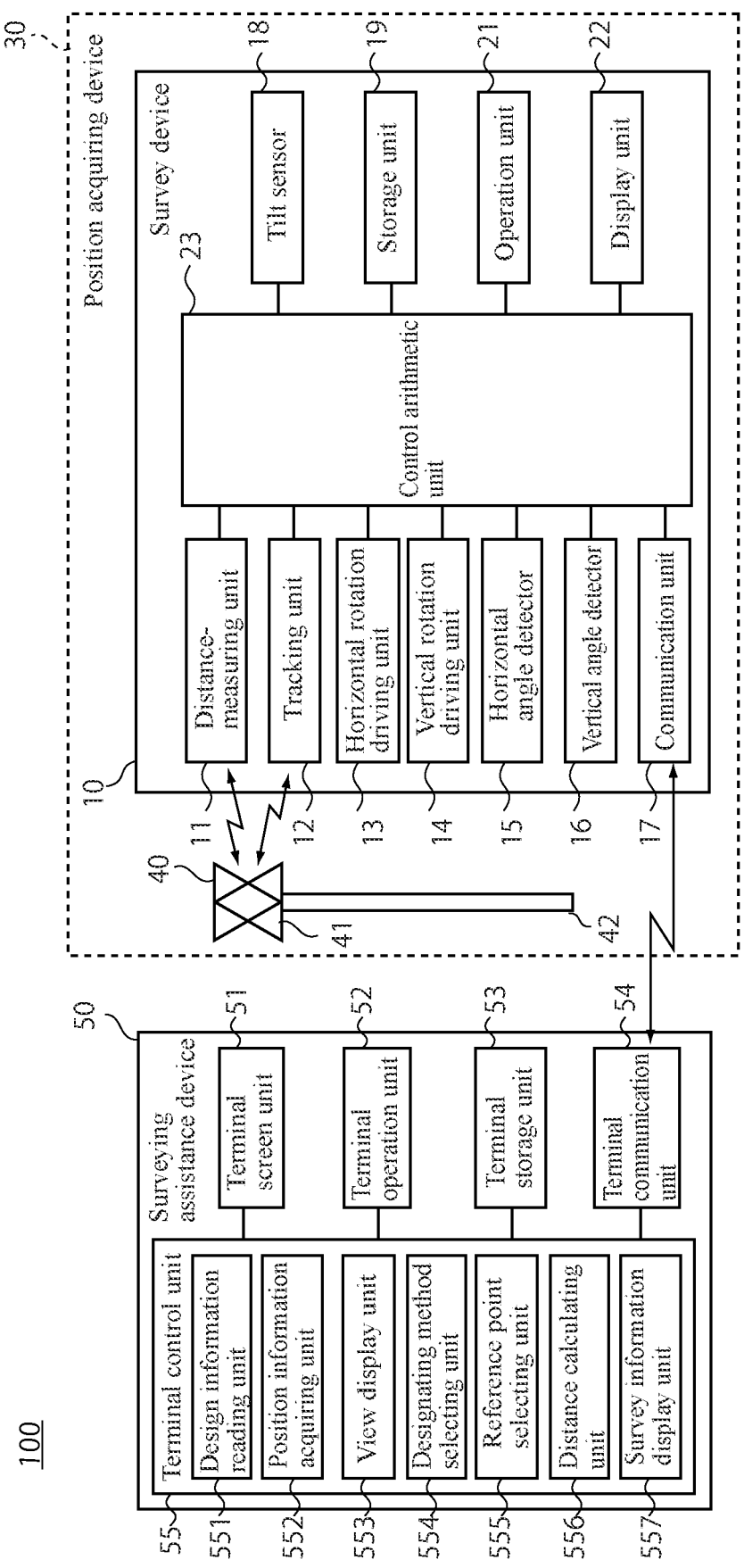
FIG. 2 is a configuration block diagram of the same surveying assistance system.

FIG. 1 is an overall schematic view of a surveying assistance system (hereinafter, simply referred to as the "system") 100 according to the embodiment of the present invention, and FIG. 2 is a configuration block diagram of the system 100. The system 100 includes a position acquiring device 30 and a surveying assistance device 50.

(Design Information)

Figure 3:
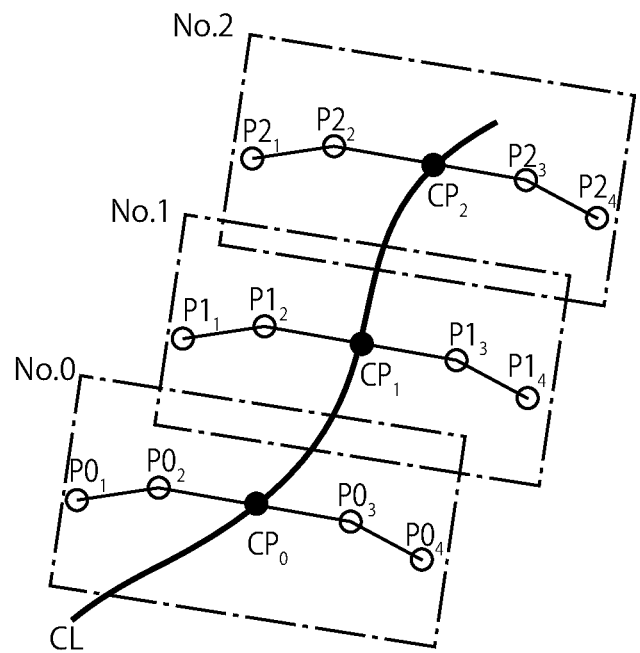
FIG. 3 is a view explaining design information used in the same surveying assistance system.

Prior to description of a configuration of the system 100, design information used in the present system will be described. FIG. 3 is a view explaining the design information used in the present system 100. The design information is, for example, information prepared with absolute coordinates, the information including a route blueprint required in work of a route, etc. The design information includes centerline data indicating a centerline CL of the route. The design information also includes center point data indicating center points $CP_0$, $CP_1$, $CP_2$, ... set at predetermined intervals (for example, intervals of 20 m) on the centerline CL. The center points are points at which center stakes are installed at a site.

The design information includes cross-sectional data indicating cross-sections (hereinafter, simply referred to also as the "sections") No. 0, No. 1, No. 2, ... which respectively include the center points $CP_0$, $CP_1$, $CP_2$, ... and are orthogonal to the centerline. On the cross-sections, constituent points are set, for example, on the section No. 0, constituent points $P0_1$ to $P0_4$ are set. The constituent points are points at which stakes serving as marks at the site are installed like points that regulate a width of a road. The constituent points are set, such as, for example, $P0_1$, $P1_1$, $P2_1$, ..., at positions whose distances from the center points on the respective sections are equal, along a route direction.

(Configuration of Position Acquiring Device 30)

The position acquiring device 30 is configured by a survey device 10 and a surveyed device 40.

The survey device 10 is a total station (electronic distance-measuring and angle-measuring instrument). The survey device 10 is installed at a known point via a tripod 2. Alternatively, coordinates may be made known by, for example, a backward intersection method, or the like after the survey device 10 is installed. Further, coordinate data of the survey device 10 is input into the surveying assistance device 50 and stored in a terminal storage unit 53.

The survey device 10 has, in appearance, a base portion 5 provided on a leveling unit 3, a bracket portion 7 to be rotated horizontally about an axis H-H on the base portion 5, and a telescope 9 to be rotated vertically about an axis V-V in the bracket portion 7. A control arithmetic unit 23 to be described later is accommodated in the bracket portion 7.

The survey device 10 includes an automatic collimation function and an automatic tracking function and an optical distance-measuring system and an optical tracking system (not illustrated) are accommodated in the telescope 9. Configurations of the optical distance-measuring system and the optical tracking system are conventionally publicly known. In the survey device 10, by cooperation of horizontal rotation of the bracket portion 7 and vertical rotation of the telescope 9, a distance-measuring light and a tracking light are irradiated over the entire circumference.

As illustrated in FIG. 2, the survey device 10 includes a distance-measuring unit 11, a tracking unit 12, a horizontal rotation driving unit 13, a vertical rotation driving unit 14, a horizontal angle detector 15, a vertical angle detector 16, a communication unit 17, a tilt sensor 18, a storage unit 19, an operation unit 21, a display unit 22, and the control arithmetic unit 23.

The distance-measuring unit 11 emits a distance-measuring light by using the optical distance-measuring system, receives a reflected light from a target 41 provided in the surveyed device 40, and automatically collimates and measures a distance to the target 41.

The tracking unit 12 emits a tracking light by using the optical tracking system, captures a position of the target 41 from a reflected light by the target 41, and in a case where the target 41 is moved, automatically tracks the target 41.

The horizontal rotation driving unit 13 is a motor provided in the base portion 5. The horizontal rotation driving unit 13 rotates the bracket portion 7 about the axis H-H with respect to the base portion 5. The vertical rotation driving unit 14 is a motor provided in the bracket portion 7. The vertical rotation driving unit 14 rotates the telescope 9 about the axis V-V.

The horizontal angle detector 15 and the vertical angle detector 16 are rotary encoders. The horizontal angle detector 15 detects an angle of the bracket portion 7 about the axis H-H, and the vertical angle detector 16 detects an angle of the telescope 9 about the axis V-V. As a result, the horizontal angle detector 15 and the vertical angle detector 16 constitute an angle-measuring unit that measures an angle to the target 41.

The communication unit 17 is a communication control device that connects the survey device 10 and the surveying assistance device 50 by wire or wirelessly. As a communications standard to realize the communication unit 17, Wi-Fi (registered trademark) as one of wireless LAN standards or 4G (fourth-generation mobile communications system) maybe adopted. Alternatively, a short-range wireless communications standard such as Bluetooth (registered trademark) and infrared communication may be adopted.

The tilt sensor 18 is a tilt sensor of a bubble tube type, a capacitance type, etc., and is fixed on an upper surface of a rotation shaft (not illustrated) of the base portion 5. A value of the tilt sensor 18 when a rotation shaft of the horizontal rotation driving unit 13 is once rotated forward and backward is read. Based on a gap amount of forward and backward rotations, horizontalness of the leveling unit 3 is adjusted.

The storage unit 19 is a storage medium that memorizes, stores, and transmits information in a form with which the control arithmetic unit 23 is capable of processing, and for example, an HDD (Hard Disc Drive), a flash memory, etc. is adopted. In the storage unit 19, the measured survey data and a program for various processing in the control arithmetic unit are stored.

The operation unit 21 is a plurality of buttons provided on an outer surface of the bracket portion 7. Various information relating to actions of the survey device 10 can be input via the operation unit 21.

The display unit 22 is a liquid crystal display provided on the outer surface of the bracket portion 7, and displays various information relating to surveying.

The control arithmetic unit 23 is a microcomputer for which a CPU (Central Processing Unit), a ROM (Read Only Memory), a RAM (Random Access Memory), etc. are mounted on an integrated circuit. The control arithmetic unit 23 is connected to the units of the survey device 10.

The control arithmetic unit 23 reads the program for executing various functions of the survey device 10 from the storage unit 19 or the RAM and controls the units of the survey device 10 to execute various functions such as automatic tracking, distance measurement, and angle measurement. The control arithmetic unit 23 also performs arithmetic processing on data obtained by distance measurement and angle measurement, and acquires position information (position coordinates) of the target 41.

Further, the control arithmetic unit 23 communicates with the surveying assistance device 50 via the communication unit 17, executes processing following an order of the surveying assistance device 50, and sends position information of the surveyed device to the surveying assistance device 50.

The surveyed device 40 includes the target 41 and a pole-shaped support member 42 that supports the target 41.

The target 41 is a so-called 360-degree prism configured by radially combining a plurality of triangular-pyramid-shaped prisms, however, the present invention is not limited to this. The target 41 retro-reflects incident light in a direction opposite to an incident direction.

In the support member 42, a length $H_1$ from a leading end to the center $O_1$ of the target 41 is known. The support member 42 includes a level (not illustrated), and can be installed vertically. By subtracting the length $H_1$ of the support member 42 from three-dimensional coordinates of the center $O_1$ determined from distance measurement and angle measurement data which is obtained by measuring the distance and the angle to the target 41 installed vertically at an observation point P via the support member 42 by the survey device 10 installed at the known point, it is possible to determine three-dimensional coordinates of the observation point P as the position information of the surveyed device 40.

As another working example of the position acquiring device 30, it is possible to use a GNSS survey device. In this case, by using a GNSS receiving device capable of communicating with the surveying assistance device 50 as the surveyed device 40, a current position of the surveyed device 40 is surveyed.

(Configuration of Surveying Assistance Device)

The surveying assistance device 50 is a portable information processing device capable of communicating with the position acquiring device 30. The surveying assistance device 50 is realized by, for example, a mobile computer terminal such as a mobile phone, a smartphone, a tablet computer, a PDA, or a data collector.

The surveying assistance device 50 includes a terminal screen unit 51, a terminal operation unit 52, the terminal storage unit 53, a terminal communication unit 54, and a terminal control unit 55.

The terminal screen unit 51 is, for example, a touch-panel type liquid crystal display integrated with the terminal operation unit 52. The terminal screen unit 51 displays images according to a work content such as an observation screen 60 or a section designating method selecting screen 80.

For the terminal storage unit 53, various programs and various data are stored in a storage medium in a readable and writable manner. The terminal storage unit 53 is, for example, an HDD. The terminal storage unit 53 may be, for example, an optical disc drive such as a CD (Compact Disc) drive. In the terminal storage unit 53, a communication program, an image display program for displaying a work content, etc. and a communication content, etc. on the terminal screen unit 51, various programs for executing observation of a center stake distance and observation of an as-built part, etc. are stored.

Further, in the terminal storage unit 53, initial setting information including coordinates of the survey device 10 and a height $H_1$ of the target 41, and the design information are also stored. The terminal storage unit 53 also stores survey data of the target 41 received from the survey device 10, and results of the observation of the center stake distance and the observation of the as-built part.

The terminal communication unit 54 is a communication control device capable of communicating with the survey device 10 via the communication unit 17 of the survey device 10, and has the same communications standard as the communication unit 17.

The terminal control unit 55 is a control unit including at least a CPU and memories (ROM, RAM), etc. The terminal control unit 55 controls the surveying assistance device 50 and the survey device 10 based on an input signal from the terminal communication unit 54, the terminal operation unit 52, etc. The terminal control unit 55 calls and executes a program stored in the RAM or the terminal storage unit 53.

The terminal control unit 55 includes a design information reading unit 551, a position information acquiring unit 552, a view display unit 553, a section designating method selecting unit (hereinafter, referred to as the "designating method selecting unit") 554, a reference point selecting unit 555, a distance calculating unit 556, and a survey information display unit 557 as functional units.

The design information reading unit 551 reads the design information stored in the terminal storage unit 53. Alternatively, the design information reading unit 551 may receive and read design information stored in an external storage device via the terminal communication unit 54.

The position information acquiring unit 552 receives the survey of the target 41 measured by the survey device 10 at a predetermined period via the terminal communication unit 54 at a predetermined period. The position information acquiring unit 552 acquires the position information of the surveyed device 40 (observation point) in an absolute coordinate system from coordinates of the survey device 10 and the height $H_1$ of the support member 42 stored in the terminal storage unit 53.

Figure 4:
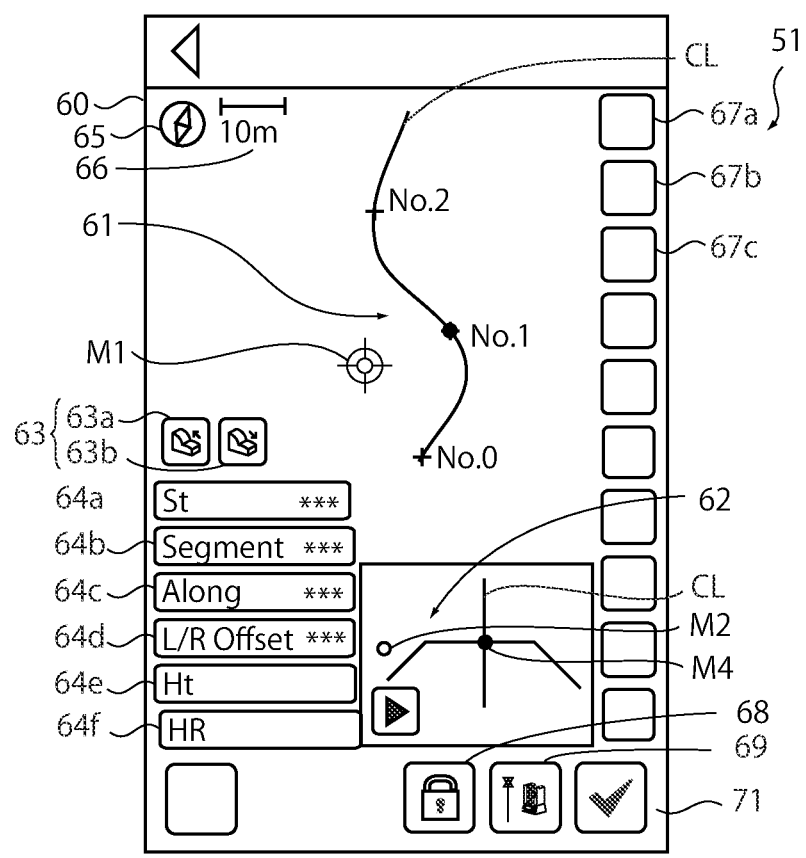
FIG. 4 is a view illustrating an example of an observation screen displayed on a terminal screen unit of a surveying assistance device of the same embodiment.

The view display unit 553 creates a plan view 61 in a state where the centerline CL of the route is looking down from directly above and a cross-sectional view 62 connecting constituent points on an arbitrary cross-section from the design information, and displays them on the observation screen 60 of the terminal screen unit 51 (FIG. 4). During execution of observation, the view display unit 553 also displays a position of the surveyed device 40 on the plan view based on the position information of the surveyed device 40 acquired by the position information acquiring unit 552, and updates the display at intervals of acquisition of the position information (FIG. 4).

The designating method selecting unit 554 displays the section designating method selecting screen 80 on the terminal screen unit 51, and selects a section designating method by worker input from, for example, a section designated by the worker in advance (hereinafter, referred to as the "designated section"), a section which is the closest to the current position of the surveyed device 40 (hereinafter, referred to as the "closest section"), and an interpolated section created as a section including an arbitrary point observed as the current position of the surveyed device, the section including the centerline CL (hereinafter, referred to as the "arbitrary section").

The reference point selecting unit 555 selects a reference point a reference point in the designation information by worker selection. The reference point is a point serving as an object with respect to which a vertical distance and a horizontal distance are to be measured. For example, the reference point can be switched by the worker tapping reference point switching buttons 63a, 63b displayed on the observation screen 60 of the terminal screen unit 51. Switching of the reference point is performed so that the position of the reference point in a direction orthogonal to the route retains, even in a case where the section is moved in the route direction. Specifically, for example, in a case where the constituent point $P0_3$ on the immediate right of the centerline CL is selected as the reference point. Then, in a case where the section No. 1 is designated, the constituent point $P1_{13}$ on the immediate right of the centerline CL on the section No. 1 is to be selected.

The distance calculating unit 556 calculates the horizontal distance and the vertical distance from the selected reference point on the section designated according to the section selecting method selected by the designating method selecting unit 554 based on the position information of the current position of the surveyed device 40 and design-based position information of the selected reference point.

Figure 5A:
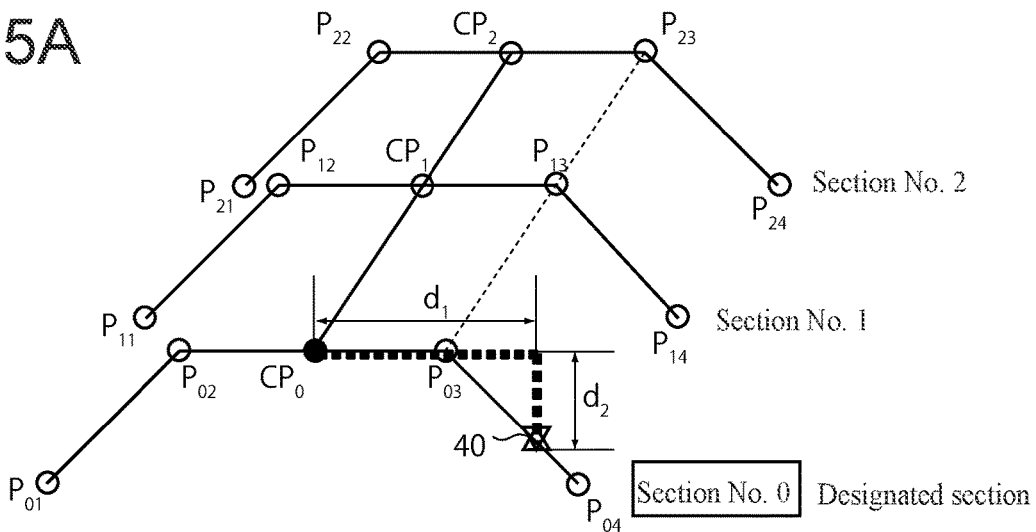
FIGS. 5A to 5C are views each explaining a method of calculating distances for each section designating method.
Figure 5B:
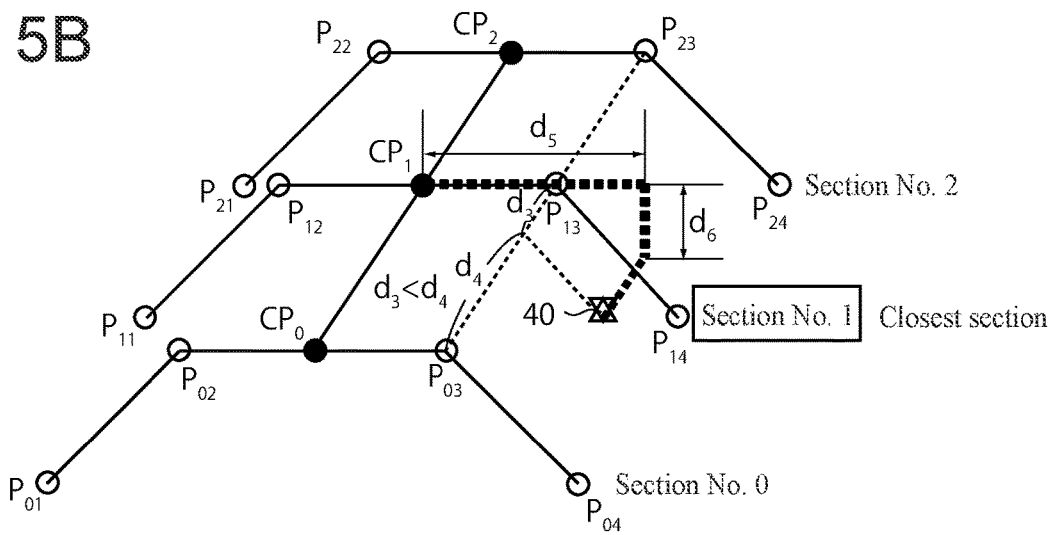
Figure 5C:
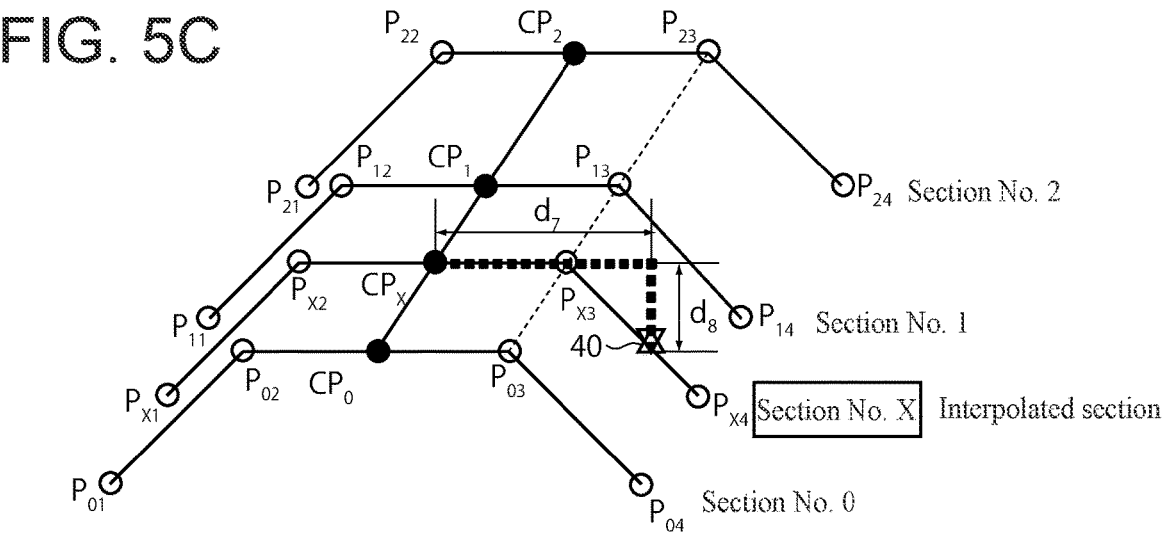

FIGS. 5A to 5C are views each explaining a method of calculating distances for each section designating method. The black circle in the figures is a point designated as the reference point. That is, for example, in a case where the designated section is selected as the section designating method, the section No. 0 is designated as the designated section, and the center point $CP_0$ is selected as the reference point, as illustrated in FIG. 5A, a horizontal distance $d_1$ and a vertical distance $d_2$ between the center point $CP_0$ on the section No. 0 and the surveyed device 40 are calculated.

In a case where the closest section is selected as the section designating method, the distance calculating unit 556 compares distances between the surveyed device 40 and two sections placed to sandwich the surveyed device 40 in the route direction, and designates the closer section as the closest section. The distance calculating unit 556 then calculates the horizontal distance and the vertical distance between a reference point and the surveyed device 40 based on the position information of the surveyed device 40 and position information of the reference point on the closest section.

For example, in a case where the center point $CP_0$ (center point $CP_0$, $CP_1$, $CP_2$, . . . ) is selected as the reference point and the surveyed device 40 is placed between the section No. 0 and the section No. 1 as illustrated in FIG. 5B, the distance calculating unit 556 first calculates a distance $d_3$ between the surveyed device 40 and the section No. 0 and a distance $d_4$ between the surveyed device 40 and the section No. 1, and compares the distances $d_3$, $d_4$. Because the comparison results in $d_3 < d_4$, the distance calculating unit 556 designates the closer section No. 1 as the closest section. The distance calculating unit 556 then calculates a horizontal distance $d_5$ and a vertical distance $d_6$ between the center point $CP_1$ on the section No. 1 and the surveyed device 40.

In a case where an arbitrary section is selected as the section designating method and the center point $CP_0$ (center point $CP_0$, $CP_1$, $CP_2$, . . . ) is selected as the reference point, as illustrated in FIG. 5C, the distance calculating unit 556 creates a section No. X including the current position of the surveyed device 40 (observation point), the section No. X being orthogonal to the centerline as an interpolated section.

The interpolated section X is created by making interpolation based on a ratio between the distances between the closest sections No. 0 and No. 1 and the current position of the surveyed device 40, the sections No. 0 and No. 1 being placed to sandwich the current position of the surveyed device 40. Then, a center point $CP_x$ on the section No. X is calculated, and a horizontal distance $d_7$ and a vertical distance $d_8$ between the center point $CP_x$ as the reference point and the surveyed device 40 are calculated. Note that although a horizontal distance in a cross-sectional direction is calculated as the horizontal distance in the above description, a horizontal distance in the route direction may be calculated at the same time.

The survey information display unit 557 displays the number of the designated section, the selected reference point, the calculated horizontal and vertical distances, etc. on the observation screen 60 of the terminal screen unit 51 as the survey information. Further, the survey information display unit 557 may display survey information such as a horizontal distance in a front and rear direction on the observation screen 60.

Functions of the functional units may be realized by a circuit, or may be realized by executing a program. In a case where the functions are realized by a program, the program can be stored in a computer-readable storage medium such as a magnetic disk, a flexible disc, an optical disc, a compact disc, a Blu-ray (registered trademark) disc, and a DVD.

(Observation Screen)

FIG. 4 illustrates an example of the observation screen 60 displayed on the terminal screen unit 51 during execution of observation. On the observation screen 60, the plan view 61 and the cross-sectional view 62 created by the view display unit 553 are displayed side by side. The centerline CL is displayed in the center of the cross-sectional view 62.

Further, in the plan view 61, a marking M1 indicating the position of the surveyed device 40 and a marking M3 indicating the selected reference point are displayed. In the cross-sectional view 62, a marking M2 indicating the position of the surveyed device 40 and a marking M4 indicating the selected reference point are displayed. Further, on the observation screen 60, the reference point switching buttons 63 (63*a*, 63*b*) for selecting the reference point are displayed. The reference point switching buttons 63 are buttons to be tapped to thereby move the selected reference point one step to the right side (63*b*) or to the left side (63*a*).

Further, on the observation screen 60, survey information displays 64*a* to 64*f* of the survey information calculated by the survey information display unit 557 are displayed. The survey information displays 64*a* to 64*f* indicate, for example, the section number, a designated reference point, a horizontal distance of the surveyed device 40 from the designated section in a front and rear direction of the route, a horizontal distance of the surveyed device 40 from the selected reference point in a left and right direction orthogonal to the front and rear direction of the route, a vertical distance of the surveyed device 40 from the designated reference point, and an objective height, that is, the length $H_1$ from the leading end of the support member 42 to the center $O_1$ of the target 41.

Further, on the observation screen 60, an orientation mark 65 indicating north, south, east, and west of the plan view 61, and a map scale 66 indicating scale may be displayed. On the observation screen 60, functional icons 67*a*, 67*b*, 67*c*, . . . each for aiding a surveying work may also be displayed.

Further, on the observation screen 60, a tracking start button 68 for ordering the survey device 10 to start and stop tracking and observation, and observation and confirmation buttons 69, 71 for stopping update of a display of the survey information and fix values are displayed.

In addition, it is possible to change a position of the cross-sectional view 62 relative to the plan view 61 which is displayed on the terminal screen unit 51 at the same time in response to a command from the terminal operation unit 52, and specifically to change the position freely in a frame by a touch panel operation. It is also possible to switch display/non-display of the cross-sectional view 62.

(Surveying Assistance Method 1)

Figure 6:
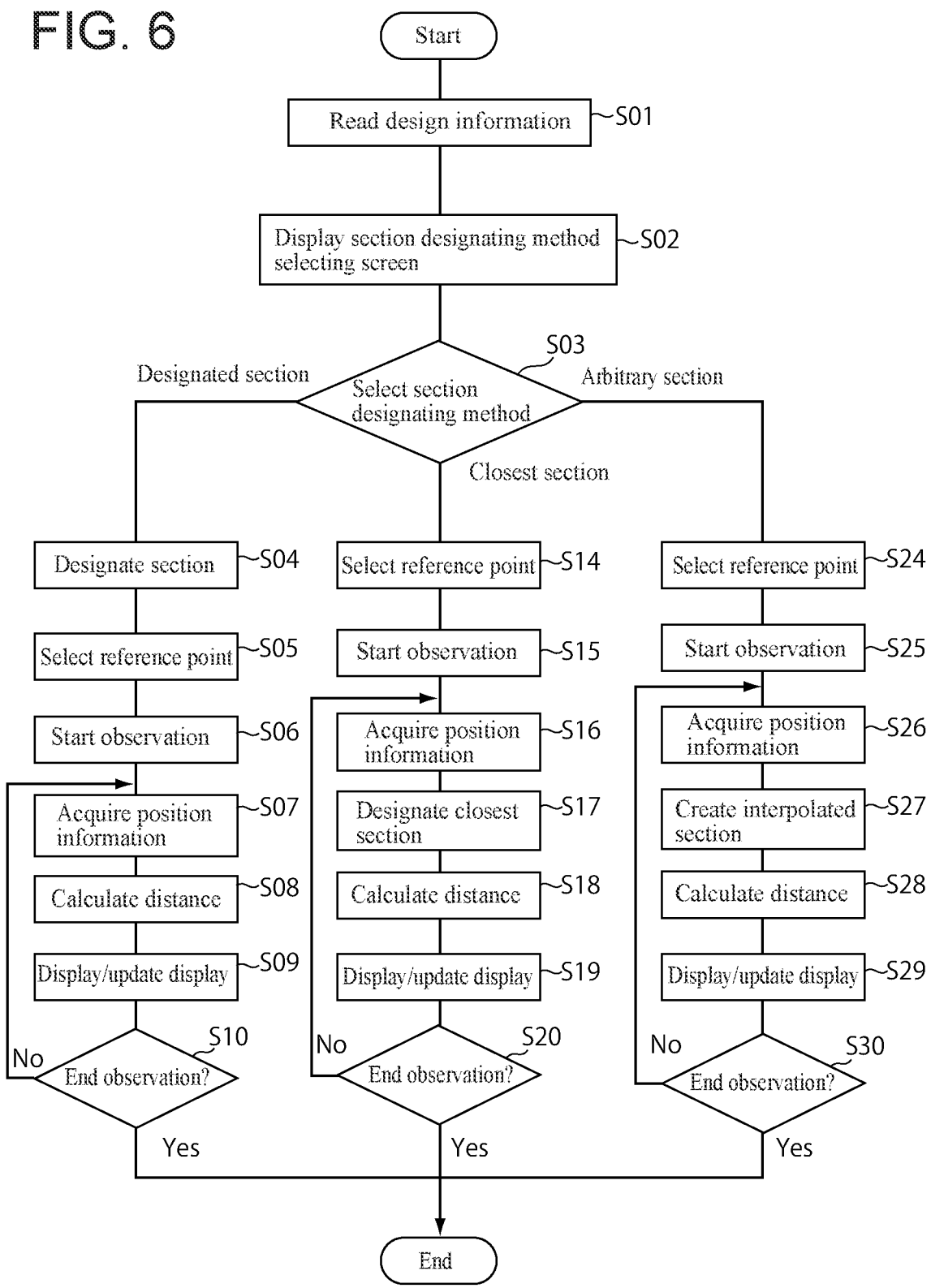
FIG. 6 is a flowchart illustrating an example of processing of the same surveying assistance device.

FIG. 6 is a flowchart illustrating processing of an example of a surveying assistance method of assisting execution of the observation of the center stake distance and the observation of the as-built part using the surveying assistance device 50 of the present embodiment. FIG. 7A is a menu screen 90 for starting the present surveying assistance method. As illustrated in FIGS. 7A to FD, the present method is displayed as a single menu which is called "Road Survey" (which is "route survey").

The survey device 10 is installed at the known point and in a state of being capable of automatically tracking the target 41.

When processing is started by tapping a route survey menu 91 of FIG. 7A, in Step S01, the design information reading unit 551 reads the design information stored in the terminal storage unit 53.

Next, in Step S02, the designating method selecting unit 554 displays the section designating method selecting screen 80 on the terminal screen unit 51. Then, in Step S03, by the worker selecting the designating method, and the arbitrary section on the screen, the designating method selecting unit 554 selects the designating method from the designated section, the closest section.

Figure 7D:
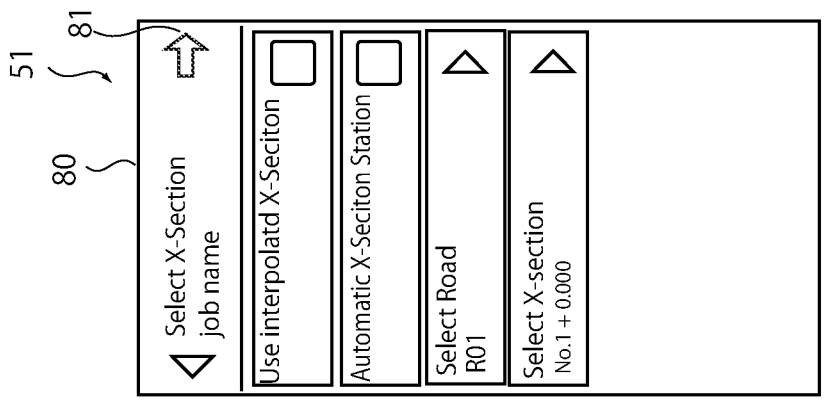
FIGS. 7A to 7D are views each illustrating an example of an operation screen displayed on the terminal screen unit of the surveying assistance device of the same embodiment.
Figure 7C:
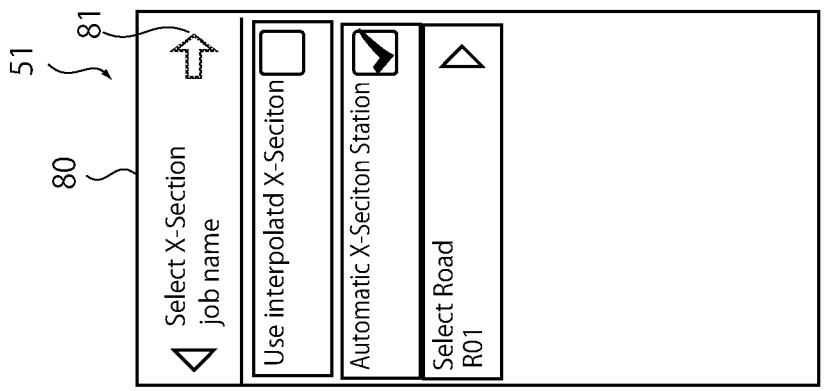
Figure 7B:
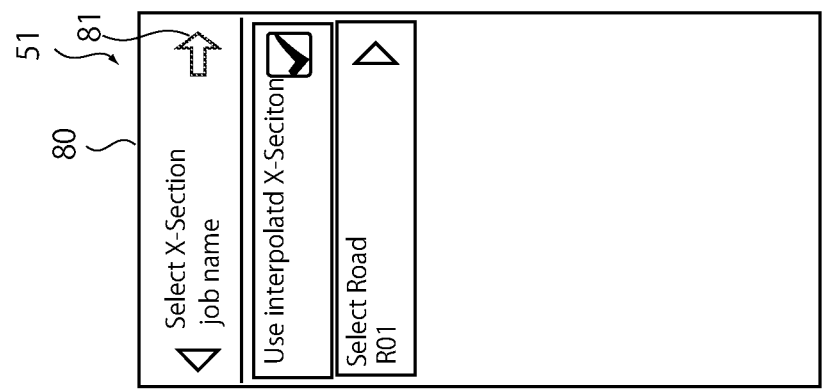
Figure 7A:
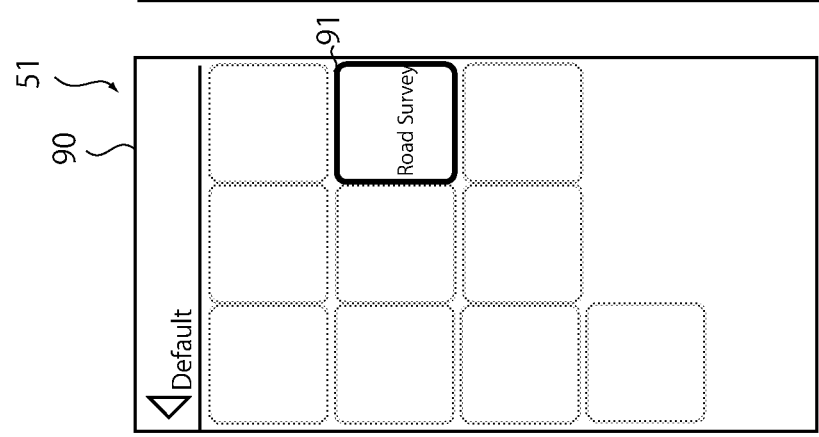

Each of FIGS. 7B to 7D is an example of the section designating method selecting screen 80. In a case where the arbitrary section is selected, as illustrated in FIG. 7B, by selecting "Use interpolated X-Section" (which is "use the interpolated section") and tapping the forward arrow 81, the arbitrary section is selected so as to shift to the observation screen 60.

In a case where the closest section is selected, as illustrated in FIG. 7C, by cancelling the selection made above, selecting "Automatic X-section Station" (which is "use the closest section"), and tapping the forward arrow 81, the closest section is selected so as to shift to the observation screen 60.

In a case where the designated section is selected, as illustrated in FIG. 7D, by cancelling the selection made above, it is possible to select the designated section. Further, after the designated section is selected, by tapping the forward arrow 81, the designated section is selected so as to shift to the observation screen 60.

In a case where the designated section is selected in Step S03, the worker designates, for example, the section No. 1 as the designated section as described above in Step S04.

Figure 8B:
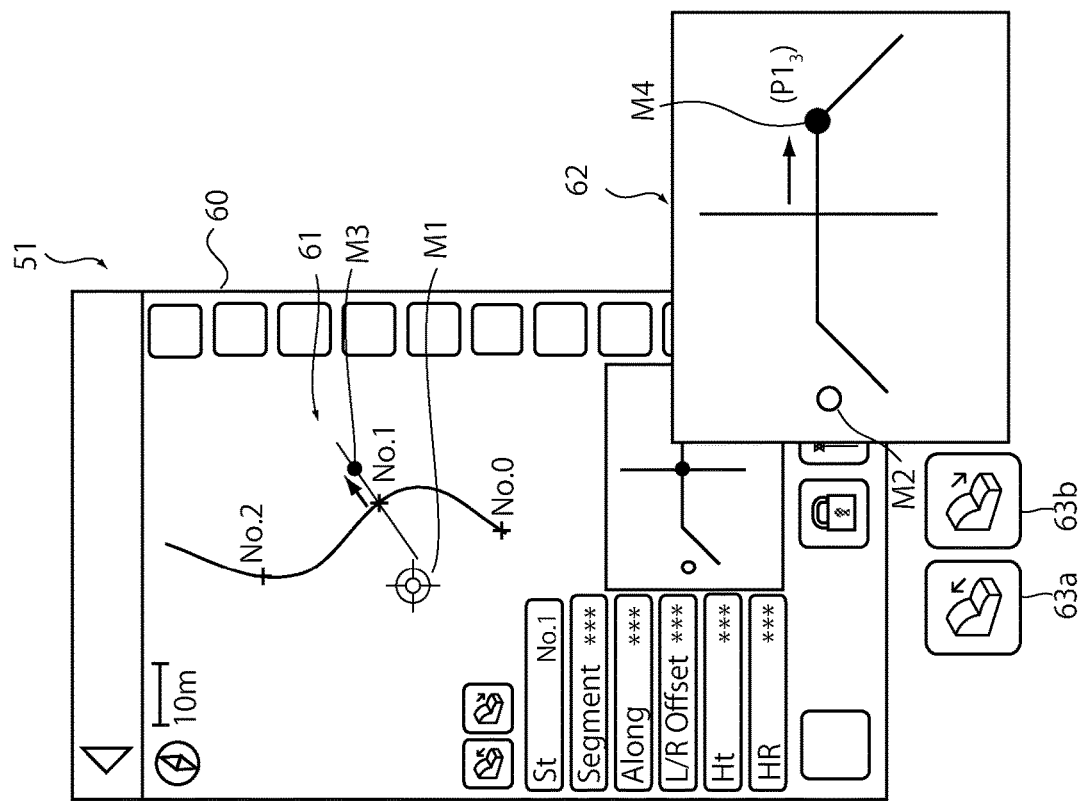
FIGS. 8A and 8B are views each illustrating an example of an observation screen displayed on the terminal screen unit of the surveying assistance device of the same embodiment, the views each being displayed by enlarging a cross-sectional view.
Figure 8A:
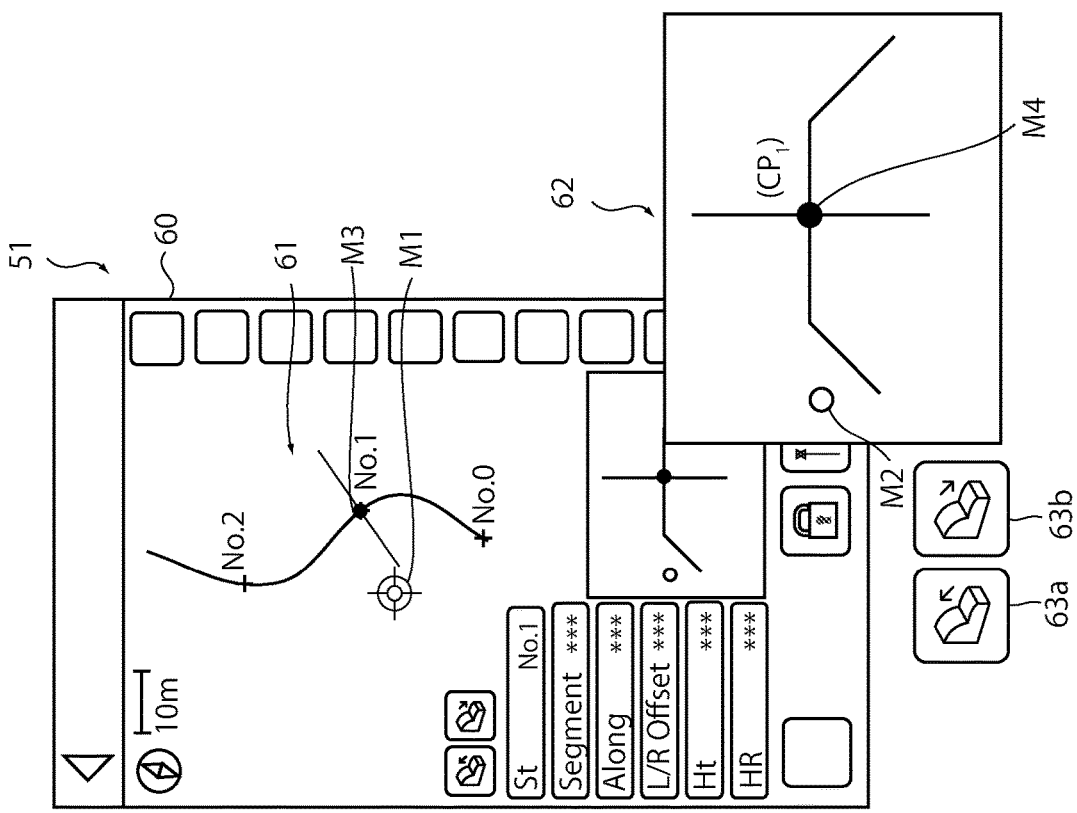

Next, in Step S05, the reference point selecting unit 555 selects a reference point by worker selection. Specifically, by tapping the reference point switching button 63b displayed on the observation screen 60 which is illustrated in FIG. 8A, the reference point set at the center point $CP_1$ and indicated by the markings M3, M4 can be switched, as illustrated in FIG. 8B, to the constituent point $P1_3$ obtained by displacing the reference point to the right. Thereby, the reference point serving as an object with respect to which the horizontal distance and the vertical distance are to be calculated can be changed between the constituent point and the center point.

Next, in Step S06, when observation is started by tapping of the observation start button, the survey device 10 sends the survey data of the target 41 to the surveying assistance device 50 at a predetermined period. Note that although not included in the flowchart of FIG. 6, the view display unit 553 displays the plan view 61 and the cross-sectional view 62 created from the design information on the observation screen 60 of the terminal screen unit 51. Every time the position information acquiring unit 552 acquires the current position of the surveyed device 40, the view display unit 553 updates a display of the markings M1, M2.

Next, in Step S07, the position information acquiring unit 552 acquires the survey data of the target 41 at a predetermined period and acquires the position information of the surveyed device 40.

Next, in Step S08, the distance calculating unit 556 calculates a horizontal distance and a vertical distance between the reference point and the surveyed device 40 on the designated section.

Next, in Step S09, the survey information display unit 557 displays the horizontal distance and the vertical distance on the observation screen 60 as the survey information.

Then, until the end of observation is determined by a worker command in Step S10, Steps S07 to S10 are repeated. In a case where the end of observation is determined, the processing is ended.

On the other hand, in a case where the closest section is selected in Step S03, in Step S14, the reference point selecting unit 555 selects a reference point in the same manner as in Step S05.

Next, in Step S15, when observation is started, the survey device 10 sends the survey data of the target 41 to the surveying assistance device 50 at a predetermined period in the same manner as in Step S06.

Next, in Step S16, the position information acquiring unit 552 acquires the survey data of the target 41 at a predetermined period and acquires the position information of the current position of the surveyed device 40.

Next, in Step S17, the distance calculating unit 556 designates the closest section from the current position of the surveyed device 40.

Next, in Step S18, the distance calculating unit 556 calculates a horizontal distance and a vertical distance between the surveyed device 40 and the reference point on the designated closest section.

Next, in Step S19, the survey information display unit 557 displays the horizontal distance and the vertical distance on the observation screen 60 as the survey information in the same manner as in Step S09.

Then, until the end of observation is determined by a worker command in Step S20, Steps S16 to S20 are repeated. In a case where the end of observation is determined, the processing is ended.

On the other hand, in a case where the arbitrary section is selected in Step S03, in Step S24, the reference point selecting unit 555 selects a reference point in the same manner as in Step S05.

Next, in Step S25, when observation is started, the survey device 10 sends the survey data of the target 41 to the surveying assistance device 50 at a predetermined period in the same manner as in Step S06.

Next, in Step S26, the position information acquiring unit 552 acquires the survey data of the target 41 at a predetermined period and acquires the position information of the surveyed device 40.

Next, in Step S27, the distance calculating unit 556 creates a section at the position of the surveyed device 40 as an interpolated section and designates the interpolated section as the designated section.

Next, in Step S28, the distance calculating unit 556 calculates a horizontal distance and a vertical distance between the reference point on the interpolated section and the position of the surveyed device 40.

Next, in Step S29, the survey information display unit 557 displays the horizontal distance and the vertical distance on the observation screen 60 as the survey information in the same manner as in Step S09.

Then, until the end of observation is determined by a worker command in Step S30, Steps S26 to S30 are repeated. In a case where the end of observation is determined, the processing is ended.

In this way, in the surveying assistance system 100 according to the present embodiment, any of the center point and the constituent point included in the design information is selectable as the reference point serving as a to calculate the horizontal distance and the vertical distance from the observation point (current position of the surveyed device). Thus, in the surveying assistance device 50, it is possible to execute two observation methods with a single menu, the observation methods including the observation of the center stake distance in which the horizontal distance and the vertical distance from the center point are measured and the observation of the as-built part in which the horizontal distances and the vertical distances from the center point and the constituent point are measured.

With the configuration described above, since a user can use the two observation methods only by understanding a method of using a single menu, convenience is improved. Further, even in a case where the user wishes to execute the two observation methods while switching between them, it is possible to execute the observation methods within a single program without switching of execution programs, etc. Thus, the burden of operation is reduced. Further, for the sake of manufacturers, since two similar programs can be integrated, it is possible to reduce the storage capacity in the storage unit.

Further, even in a case where there is a need for measuring a design-based set section as the designated section, there is sometimes a case where it is difficult to perform surveying at a site due to an obstacle, etc. In the present embodiment, it is possible to utilize the closest section as the designated section. Thus, in a case where it is difficult to perform surveying on the design-based set section as described above, it is possible to measure a horizontal distance and a vertical distance as approximate values by measuring a horizontal distance and a vertical distance on the closest section.

Further, design-based center points are set at predetermined intervals, for example, intervals of 20 m. However, at an actual site, there is a point (change point) where the route radically curves or a part which is thought to require a change in a width. In such a case, there is also a need for performing the observation of the center stake distance for parts other than the design-based set section. In the present embodiment, it is possible to create an interpolated section at an arbitrary place as the designated section and acquire a horizontal distance and a vertical distance with reference to a center point (or a constituent point) on the interpolated section. Thus, it is possible to perform observation according to need even at a part where there is no design-based section set.

Further, in the present embodiment, the display of calculated values of the horizontal distance and the vertical distance is updated every time the current position of the surveyed device is acquired at a predetermined period. However, when the worker desires, it is possible to temporarily stop the update of the display of the calculated values by a simple action of tapping the confirmation button. With the configuration described above, in a case where the values are changed and it takes time to measure, it is possible to efficiently perform surveying with appropriate precision.

(Surveying Assistance Method 2)

Figure 9:
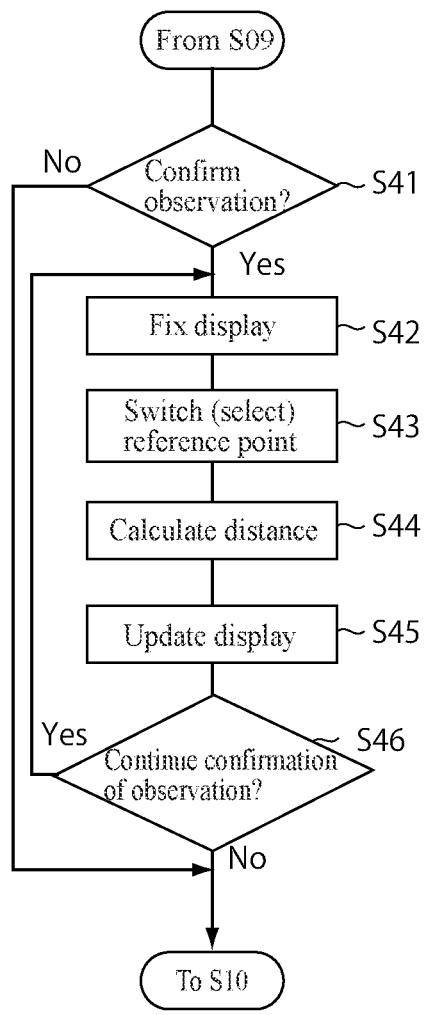
FIG. 9 is a flowchart illustrating another example of the processing of the same surveying assistance device.

FIG. 9 is a flowchart illustrating processing of another example of the surveying assistance method of assisting the execution of the observation of the center stake distance and the observation of the as-built part using the surveying assistance device 50 of the present embodiment.

In the present method, processing described in the flowchart of FIG. 9 can be executed between Steps S09 and S10, between Steps S19 and S20, or between Steps S29 and S30 in the flowchart of FIG. 6. An example in which the designated section plane is selected will be described.

After the end of Step S09, when the observation and confirmation button 69 on the observation screen 60 is tapped in Step S41, in Step S42, a current display of the survey information display unit 557 is fixed as is.

Next, when the reference point is switched by tapping of the reference point switching button 63a or 63b in Step S43, in Step S44, the distance calculating unit 556 calculates a horizontal distance and a vertical distance from a new reference point and the position information of the surveyed device 40 previously acquired in Step S07. Next, in Step S45, the distance calculating unit 556 updates the display.

Next, in Step S46, it is judged whether or not confirmation of observation is continued again. In a case where the confirmation of the observation is completed by pressing the observation and confirmation button 69 again, etc., the processing shifts to Step S010.

In this way, it is possible to switch the reference point while fixing the current position by the observation and confirmation button 69 and calculate distances with respect to another reference point as well. With the configuration described above, without setting the reference point and the section again, it is possible to calculate and confirm horizontal distances and vertical distances with respect to two or more constituent points in terms of the same point.

MODIFIED EXAMPLE

As a modified example of the present embodiment, an example in which it is called an intermediate function, a horizontal distance and a vertical distance can also be measured from an inclined plane on the design information in addition to the reference point serving as a standard at the time of measuring the horizontal distance and the vertical distance will be described.

Figure 10:
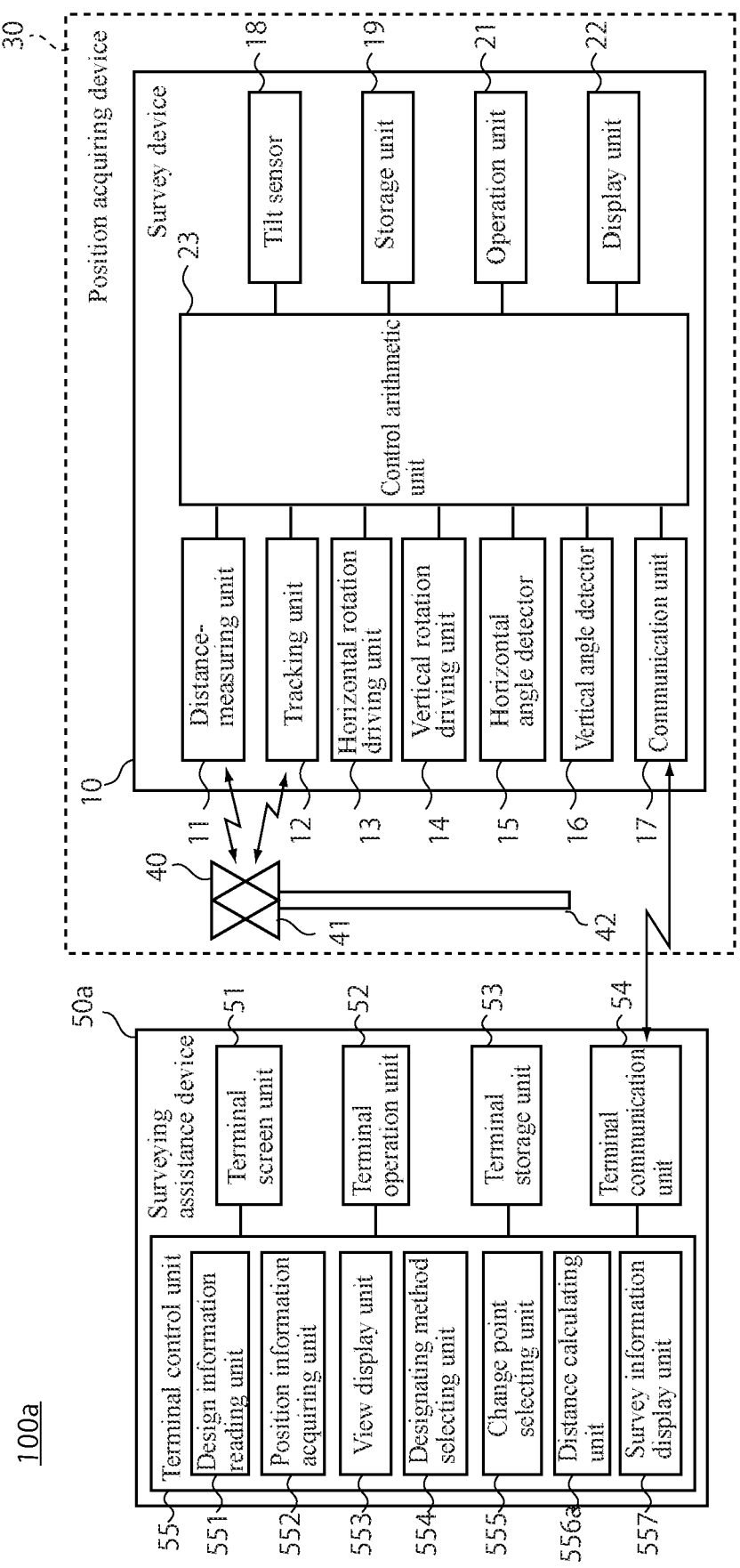
FIG. 10 is a configuration block diagram of a surveying assistance system according to a modified example of the same embodiment.

FIG. 10 is a configuration block diagram of a surveying assistance system 100a according to the modified example. In the system 100a, a terminal control unit 55a of a surveying assistance device 50a includes a distance calculating unit 556a in place of the distance calculating unit 556.

The distance calculating unit 556a has the following function in addition to the function of the distance calculating unit 556. That is, in a case where the intermediate function is selected, the distance calculating unit 556a does not calculate a horizontal distance and a vertical distance between a reference point and the position of the surveyed device 40 but calculates a horizontal distance and a vertical distance from the current position of the surveyed device 40 with respect to a design-based plane (inclined or horizontal plane) including the reference point.

Each of FIGS. 11A to 11F illustrates a plane (inclined or horizontal plane) serving as a reference to which a horizontal distance and a vertical distance are to be calculated when the surveyed device 40 is placed at each of various positions in a cross-sectional view (part). In the figures, a solid line illustrates a cross-sectional view in the design information, a circle indicates a constituent point, and a broken line containing the surveyed device 40 indicates a horizontal distance $d_9$ and a vertical distance $d_{10}$ determined by the present function.

Note that the intermediate function may be assigned to one of the functional icons 67a, 67b, 67c, . . . (FIG. 4) displayed on the observation screen 60 so as to be executable.

With the configuration described above, it is possible to determine the horizontal distance and the vertical distance of the current position not only from the reference point but also from the inclined plane. By doing so, it is also possible to deal particularly with a circumstance where measurement cannot be performed due to existence of an obstacle, etc. on a constituent point that the worker wishes to measure and a difference with respect to the inclined plane as a point close to the constituent point has to be calculated.

With the configuration described above, it is possible to measure a horizontal distance and a vertical distance from a plane at the position of the surveyed device 40 in addition to the horizontal distance and the vertical distance from the constituent point or the center point.

10: Survey device
30: Position acquiring device
40: Surveyed device
50: Surveying assistance device
55: Terminal control unit
64a: Survey information display
64b: Survey information display
64c: Survey information display 64d: Survey information display
64e: Survey information display
100: System
511: Design information reading unit
551: Design information reading unit
552: Position information acquiring unit
556: Distance calculating unit
557: Survey information display unit

The invention claimed is:

1. A surveying assistance device comprising:
screen; and
a terminal control unit including a processor and a memory, wherein
the processor is configured to:
read design information including center point data of center points set on a centerline of a route and constituent point data of constituent points set on sections including the center points, the sections being orthogonal to the centerline;
acquire position information indicating a current position of a surveyed device at a predetermined period;
calculate a horizontal distance and a vertical distance between the current position and a reference point on a designated section based on the position information and the design information;
display the horizontal distance and the vertical distance on an observation screen of the screen as survey information, and update display at intervals of the predetermined period; and
display the position information and the design information on the observation screen, wherein
the reference point is a point to be selected from the center point or the constituent point, wherein
a position of the reference point in a direction orthogonal to the route is switched by pressing a reference point switching button displayed on the observation screen, and wherein
switching of the reference point is performed so that a position of the reference point in the direction orthogonal to the route retains even in a case where a designated section is moved in a route direction.

2. The surveying assistance device according to claim 1, wherein
a section which is the closest to the current position of the surveyed device is selectable from sections included in the design information as the designated section.

3. The surveying assistance device according to claim 1, the processor is configured to:
create an arbitrary section including the current position of the surveyed device, the arbitrary section being orthogonal to the centerline, by making interpolation between two sections placed to sandwich the current position, the two sections being included in the design information, wherein
the arbitrary section is selectable as the designated section.

4. The surveying assistance device according to claim 3, wherein
a section designated by a worker from the sections included in the design information;
a section which is the closest to the current position of the surveyed device from the sections included in the design information; or
the arbitrary section
is selectable as the designated section.

5. The surveying assistance device according to claim 1, wherein
the processor is configured to calculate and display the horizontal distance and the vertical distance between the position of the surveyed device and a plane linearly connecting two closest constituent points on the designated section.

6. A surveying assistance system comprising:
the surveying assistance device according to claim 1,
a position acquiring device that acquires the current position of the surveyed device; and
wherein
the position acquiring device and the surveying assistance device are configured to be capable of communication with each other.

7. A surveying assistance method comprising
making a computer including a screen, a processor and a memory,
read design information including center point data of center points set on a centerline of a route and constituent point data of constituent points set on sections including the center points, the sections being orthogonal to the centerline,
acquire position information indicating a current position of a surveyed device at a predetermined period,
calculate a horizontal distance and a vertical distance between the current position and a reference point on a designated section based on the position information and the design information,
display the horizontal distance and the vertical distance on an observation screen of a screen of the computer as survey information,
update display at intervals of the predetermined period; and
display the position information and the design information on the observation screen, wherein
the reference point is a point to be selected from the center point or the constituent point, wherein
a position of the reference point in a direction orthogonal to the route is switched by pressing a reference point switching button displayed on the observation screen, and wherein
switching of the reference point is performed so that a position of the reference point in the direction orthogonal to the route retains even in a case where a designated section is moved in a route direction.

8. The surveying assistance method according to claim 7, wherein
a section which is the closest to the current position of the surveyed device is selectable from sections included in the design information as the designated section.

9. The surveying assistance method according to claim 7, the surveying assistance program to make the computer:
create an arbitrary section including the current position of the surveyed device, the arbitrary section being orthogonal to the centerline, by making interpolation between two sections placed to sandwich the current position, the two sections being included in the design information, wherein
the arbitrary section is selectable as the designated section.

10. The surveying assistance method according to claim 9, wherein
a section designated by a worker from the sections included in the design information;
a section which is the closest to the current position of the surveyed device from the sections included in the design information; or
the arbitrary section is selectable as the designated section.

11. The surveying assistance method according to claim 7, further comprising:

making the computer calculate and display the horizontal distance and the vertical distance between the position of the surveyed device and a plane linearly connecting two closest constituent points on the designated section.

12. A computer-readable storage medium comprising: a program for making a computer, read design information including center point data of center points set on a centerline of a route and constituent point data of constituent points set on sections including the center points, the sections being orthogonal to the centerline;

acquire position information indicating a current position of a surveyed device at a predetermined period;

calculate a horizontal distance and a vertical distance between the current position and a reference point on a designated section based on the position information and the design information;

display the horizontal distance and the vertical distance on an observation screen of a screen of the computer as survey information;

update the display at intervals of the predetermined period; and display the position information and the design information on the observation screen, wherein the reference point is a point to be selected from the center points or the constituent points, wherein a position of the reference point in a direction orthogonal to the route is switched by pressing a reference point switching button displayed on the observation screen, and wherein switching of the reference point is performed so that a position of the reference point in the direction orthogonal to the route retains even in a case where a designated section is moved in a route direction.

* * * * *